United States Patent [19]

Mang et al.

[11] Patent Number: 5,171,820

[45] Date of Patent: Dec. 15, 1992

[54] HYDROXY-FUNCTIONAL POLYESTERS AS THERMOPLASTIC BARRIER RESINS

[75] Inventors: Michael N. Mang; Jerry E. White, both of Midland, Mich.

[73] Assignee: The Dow Chemical Company, Midland, Mich.

[21] Appl. No.: 699,046

[22] Filed: May 13, 1991

[51] Int. Cl.$^5$ ............................................. C08G 59/00
[52] U.S. Cl. ........................................ 528/87; 528/93; 528/176; 528/182; 528/297; 528/361; 525/523; 525/530
[58] Field of Search .................. 528/87, 93, 176, 182, 528/297, 361; 525/933, 523, 530

[56] References Cited

U.S. PATENT DOCUMENTS

| | | | |
|---|---|---|---|
| 3,477,990 | 11/1969 | Dante et al. ....................... | 525/523 |
| 3,948,855 | 4/1976 | Perry ................................... | 525/523 |
| 4,661,541 | 4/1987 | Batzill et al. ....................... | 528/361 |
| 4,742,096 | 5/1988 | Craun .................................. | 528/93 |

FOREIGN PATENT DOCUMENTS 6225151 7/1985 Japan .

*Primary Examiner*—Melvyn I. Marquis
*Assistant Examiner*—Randy Gulakowski

[57] ABSTRACT

Polyesters having improved barrier to oxygen are normally solid, thermoplastic methylol polyesters having backbone repeating units containing pendent hydroxyl and methylol moieties and divalent organic moieties such as m-phenylene, p-phenylene, and isopropylidene diphenylene. Such polyesters are prepared by reacting diglycidyl esters of aromatic diacids such as diglycidyl terephthalate or diglycidyl ethers of dihydric phenols with diacids such as isophthalic acid.

16 Claims, No Drawings

HYDROXY-FUNCTIONAL POLYESTERS AS THERMOPLASTIC BARRIER RESINS

BACKGROUND OF THE INVENTION

This invention relates to thermoplastic polyesters and to articles prepared from such polyesters.

Polyesters such as polyethylene terephthalate are used commercially in the packaging of various materials such as seasonings, carbonated beverages, detergents, cosmetics, etc. See, "Thermoplastic Polyester Resins for Containers" D. P. Callander, *Polym. Sci.*, 25(8), 453–457(1985). While polyethylene terephthalate exhibits adequate gas barrier properties for containing some materials, it is inadequate for containing and storing such materials as beer, wine and low-acid foods such as meats or vegetables.

In order to improve the barrier properties of these polyesters, it has been recently learned to use hydroxyphenoxyether polyalkylene terephthalates and other hydroxyphenoxyether esters in packaging applications requiring improved barrier. —See, for example, Japanese Patent Shutsugan Kokai No. 62-25151. While such polymers exhibit improved barrier properties, they are generally used in blends with other polymers because, in neat form, they undergo crosslinking when extruded or otherwise processed at temperatures above their glass transition temperatures.

In view of the limited barrier properties of the polyethylene terephthalates and the poor thermal processability of polyesters having pendant hydroxyl moieties and phenoxyether moieties, it would be highly desirable to provide a polymer having good thermal processability and a genuinely high barrier (i.e., oxygen transmission rate less than 2.0 cm$^3$-mil/100 in$^2$-atm-day) to oxygen. Polymers that retain such high barrier in both dry and moist environments would be especially desirable.

SUMMARY OF THE INVENTION

The present invention is, in one aspect, a normally solid, thermoplastic methylol polyester having repeating units represented by the formula:

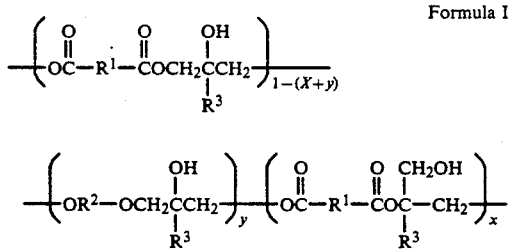

Formula I wherein each of $R^1$ and $R^2$ is individually a divalent organic moiety which is predominantly hydrocarbon, each $R^3$ is individually hydrogen or lower alkyl, y is a fraction from 0 to 0.5 and x is a fraction from about 0.05 to about 0.4.

In another aspect, this invention is a process for preparing the methylol polyester which comprises contacting a dicarboxylic acid or a mixture of two or more dicarboxylic acids with a diglycidyl ether, a diglycidyl ester or a combination thereof in the presence of an onium catalyst in an ether solvent under conditions sufficient to form the polyester. Surprisingly, this process employing an onium catalyst in an ether solvent yields in thermoplastic polymer which is in contrast to the prior art processes which employ a base catalyst in an amide solvent and yield a substantially crosslinked polymer which is not thermoplastic.

In another aspect, this invention is an article suitable for packaging oxygen-sensitive materials such as foodstuffs and medicines wherein the article is fabricated of the methylol polyester. This article can be in the form of a molded container, an impermeable film or a coating or an interlayer of a laminate or a coextruded container.

In addition to their use as barrier containers and films, the polymers of this invention are also useful as molding, extrusion and casting resins.

DETAILED DESCRIPTION OF ILLUSTRATIVE EMBODIMENTS

The methylol polyesters of this invention are precessible as thermoplastics. For the purposes of this invention, a thermoplastic is defined as a material which flows at temperatures above its glass transition temperature and in which crosslinking or network formation does not occur. Thermoplastic processing is defined as heating a material to a temperature sufficient for flow to occur, with subsequent or concurrent forming into a shaped article. The article can be reheated and reformed any desired number of times, and the polymer does not undergo significant crosslinking or network formation during this handling. A test for crosslinking can be made by attempting to dissolve the polymeric material in an organic solvent, especially after exposure to the temperatures normally encountered during thermoplastic processing. Crosslinked polymers will not dissolve, while uncrosslinked polymers will dissolve in solvents for organic polymers. Thermoplastic polymers may be extruded at temperatures above their glass transition temperatures or they can be compression molded into films and plaques. Such polymers remain both soluble and processible after such thermal treatment.

In the preferred methylol polyesters of this invention as defined by the aforementioned Formula I, each of $R^1$ and $R^2$ is individually a divalent aromatic moiety such as arylene, alkylenearylene, dialkylenearylene, diaryleneketone, diarylenesulfone, diarylenesulfoxide, alkylidene-diarylene, diarylene oxide, diarylene sulfide and diarylenecyanomethane. Examples of divalent aromatic moieties include p-phenylene, m-phenylene and naphthalene, diphenylene-isopropylidene, 3,3'-dialkyldiphenylene-isopropylidene, diphenylenemethane, 3,3',4,4'-tetraalkyldiphenylene-isopropylidene, and the corresponding alkyl-substituted derivatives of the other named divalent aromatic moieties. Of these divalent aromatic moieties. p-phenylene, m-phenylene and diphenylene-isopropylidene are more preferred, with p-phenylene being most preferred. Alternatively, each of $R^1$ and $R^2$ is individually (1) an aliphatic, hydrocarbon, divalent moiety such as alkylene, cycloalkylene and alkenylene, advantageously those having from 2 to 10 carbons or (2) an aliphatic heteroatomic moiety having an alkylene or cycloalkylene groups which are interrupted by a heteroatomic moiety such as oxygen, sulfur, imino, sulfonyl, carboxyl, carbonyl and sulfoxyl. Of these aliphatic divalent moieties, the alkylenes, such as ethylene, propylene and butylene, are more preferred.

In Formula I, x is preferably a number from 0.05 to 0.4, most preferably from 0.1 to 0.3, and y is preferably from 0 to 0.5. Each $R^3$ is individually hydrogen or a hydrocarbyl or substituted hydrocarbyl wherein hydrocarbyl is a monovalent hydrocarbon such as alkyl, cycloalkyl, aralkyl, or aryl and the substituent(s) is a monovalent moiety which is inert in the reactions used to prepare the methylol polyester. The polyesters are most preferably those represented by the formula:

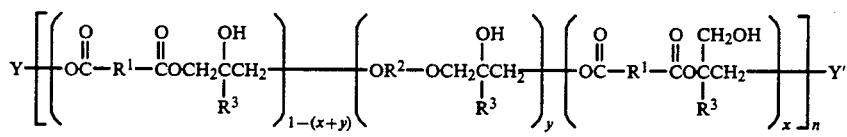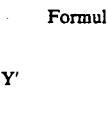

Formula II wherein $R^1$, $R^2$, $R^3$, x and y are as defined above. Typically Y is hydrogen or glycidyl and Y' is glycidyl arylene ether, glycidyl alkyene ester, glycidyl alkylene ether or glycidyl arylene ester.

The polyesters are suitably prepared by contacting one or more of the diglycidyl esters of diacid with one or more diacids or anhydrides under conditions including the use of an onium catalyst sufficient to cause the acid moieties to react with epoxy moieties to form a polymer backbone having ester linkages and pendant methylol moieties. Optionally a diglycidyl ether of a dihydric phenol can be employed to provide ether moieties in the polymer chain as well as ester moieties. Also, the polyesters are optionally terminated by including monofunctional acids or glycidyl compounds by methods well known to those skilled in the art.

Examples of suitable diacids include (1) aromatic diacids such as phthalic, terephthalic and isophthalic acids and biphenyl and naphthalene dicarboxylic acids, as well as (2) aliphatic diacids such as adipic, suberic and sebacic acids. In addition, mixtures of different diacids can be suitably employed. Of these diacids, terephthalic acid is most preferred.

Examples of suitable dihydric phenols include 4,4'-isopropylidene bisphenol (bisphenol A), 4,4'-dihydroxydiphenylethylmethane, 3,3'-dihydroxydiphenyldiethylmethane, 3,4'-dihydroxydiphenylmethylpropylmethane, bisphenol, 4,4'-dihydroxydiphenyloxide, 4,4'-dihydroxydiphenylcyanomethane, 4,4'-dihydroxybiphenyl, 4,4'-dihydroxybenzophenone, 4,4'-dihydroxydiphenyl sulfide, 4,4'-dihydroxydiphenyl sulfone, 2,6-dihydroxynaphthalene. 1,4'-dihydroxynaphthalene, catechol, resorcinol, hydroquinone and other dihydric phenols listed in U.S. Pat. Nos. 3,395,118; 4,438,254 and 4,480,082 which are hereby incorporated by reference. In addition, mixtures of different dihydric phenols can be employed. Of these other dihydric phenols, bisphenol A, hydroquinone and mixtures thereof are most preferred.

Examples of preferred onium catalysts include tetrahydrocarbyl quaternary ammonium halides wherein hydrocarbyl is a monovalent hydrocarbon radical such as alkyl, aryl, cycloalkyl, aralkyl and alkaryl, preferably having from 1 to 16 carbons. Examples of such preferred onium catalysts include tetrakis(n-butyl)ammonium bromide and the corresponding chloride, iodide and fluoride, with tetrakis(n-butyl)ammonium bromide being most preferred. Other suitable onium catalysts include tetrahydrocarbyl phosphonium halides such as ethyltriphenylphosphonium iodide and tetraphenylphosphonium bromide.

The polyesters are suitably prepared at temperatures in the range from about 60° C. to about 160° C. under an inert atmosphere. Preferred conditions for preparing such polyesters are set forth in the following working examples.

The barrier articles, for example, containers, films and coatings, of this invention are fabricated from the polyesters using conventional fabricating techniques for normally solid, thermoplastic polymers such as extrusion, compression molding, injection molding, blow molding and similar fabrication techniques commonly employed to produce such articles.

The following examples are given to illustrate the invention and should not be interpreted as limiting it in any way. Unless stated otherwise, all parts and percentages are given by weight.

EXAMPLE 1

A. Preparation of the Polyester

In a 100-mL resin kettle equipped with stirrer, condenser and nitrogen sparge, a mechanically stirred mixture of 9.35 g (33.6 mmol) of diglycidyl terephthalate. 5.57 g (33.6 mmol) of terephthalic acid and 4.01 g (12.5 mmol) of tetrakis(n-butyl)ammonium bromide is charged with 35 mL of dioxane and then heated under nitrogen to a temperature of 100° C. for 42 hours. The hot reaction product is then poured into 500 mL of water in a blender. The precipitated product is filtered, redissolved in dimethylformamide (DMF) (100 mL) and reprecipitated by pouring into 500 mL of water. The resulting product is then collected by suction filtration and dried at 85° C. for a period of hours. The polyester is represented by the formula:

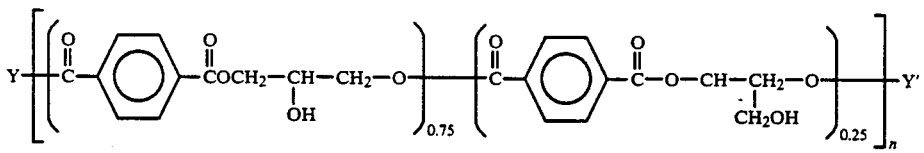

Formula III wherein Y and Y' are as previously defined.

Following the foregoing procedure, several additional polyesters are prepared using different diacids and diglycidyl esters as reported in Table I. In each of these polyesters, $R^3$ is hydrogen.

B. Polyester Testing

Each polyester is tested for intrinsic viscosity and Tg. Polyester specimens (10 cm × 10 cm × 0.013 cm) for oxygen barrier evaluations are prepared by compression molding samples (3.5 g) of the polymer between Teflon sheets in a brass template at 200° C. to 230° C. at 2000 psi (13.8 mPa) for 10 to 30 minutes, then at 200,000 to 400,000 psi (1380 to 2750 mPa) for 2 to 4 minutes and then cooled at 200,000 to 400,000 psi for 10 minutes.

Oxygen transmission rates are then measured for the samples. The results of these tests are reported in Table I.

TABLE I

| Sample No. | R¹① | n inh② (dL/g) | Tg③ (°C.) | OTR④⑤ (RH⑥) |
|---|---|---|---|---|
| 1 | 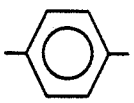 | 0.47 | 102 | 0.8 (60%) |
| 2 | 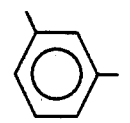 | 0.40 | 97 | 0.8 (60%) |

①From Formula I
②η inh - inherent viscostiy in DMF at 0.5 g/dL and 25° C.
③Tg - glass transition temperature
④ASTM Method D-3985 measured for compression molded films (23° C.-24° C.)
⑤Oxygen transmission rate (OTR) measured in cc-mil/100 in²-day-atm
⑥Relative humidity of the oxygen stream As evidenced by the data of Table I, the thermoplastic polyesters of this invention exhibit excellent barrier to oxygen permeation.

EXAMPLE 2

A 100 mL minireactor equipped with a stirrer, two nitrogen inlets and a thermometer is charged with the diglycidyl ether of hydroquinone (8.12 g, 36.4 mmol, epoxy equivalent weight—111.67 g/equiv epoxide), terephthalic acid (5.99 g, 36.0 mmol) and tetrakis(n-butyl)ammonium bromide (4.01 g, 12.5 mmol). The mixture is stirred while flowing nitrogen into the reactor and adding 50 mL of diglyme and then heated to 155° C. for 6 hours. The resulting two-phase product is poured into 500 mL of water in a blender and the precipitated product is collected by filtration and dried in a vacuum oven at 60° C. overnight. The filtered product is dissolved in DMF (100 mL), and the solution is poured into 500 mL of water. The reprecipitated product is collected by filtration and dried at 60° C. for 18 hours. The resulting polyester is compression molded into a film under the conditions described in Part B of Example 1. The film is soluble in dimethyl formamide and is thus not crosslinked to any significant degree. The polyester product is a hydroxy/methylol poly(ester/ether) represented by the formula:

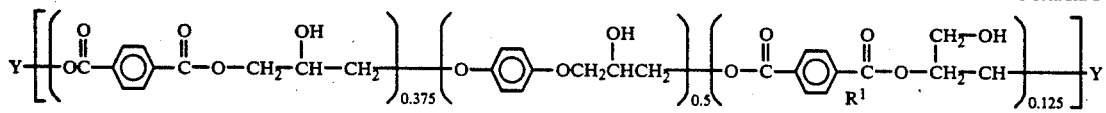

Formula IV wherein Y and Y' are as defined hereinbefore is tested for intrinsic viscosity, Tg and oxygen permeability and the results (Sample No. 1) are reported in Table II.

EXAMPLE 3

A 500 mL flask equipped with a stirrer, condenser, and nitrogen inlet is charged with the diglycidyl ether of bisphenol-A (85.0 g, 0.245 mmol), isophthalic acid (40.9 g, 0.246 mmol) and tetrakis(n-butyl)ammonium bromide (20.00 g, 62 mmol). The flask is purged with nitrogen and 250 mL of dioxane is added. The resulting mixture is heated to reflux for 3.5 hours and 5 mL of glacial acetic acid is added. The mixture is stirred at reflux for an additional hour and allowed to cool to 25° C. The solution of product is poured into 2 L of water and the resulting precipitate is collected by filtration and dried under vacuum at 70° C. overnight. The product is then dissolved in dioxane (550 mL) and reprecipitated by pouring into 2 L of water. The product is collected by filtration and dried under vacuum. This polyester is tested for inherent viscosity, Tg and oxygen permeability and the results are reported in Table II.

Several additional hydroxy/methylol poly(ether/esters) are similarly prepared using different diacids and diglycidyl ethers of dihydric phenols as reported in Table II and tested for intrinsic viscosity, Tg and oxygen permeability. The results (Sample Nos. 2-9) are reported in Table II. In all of these hydroxy/methylol poly(ether/esters), R³ is hydrogen.

TABLE II

| Sample No. | Composition R¹① | R²① | n inh② (dL/g) | Tg③ (°C.) | OTR④⑤ (RH⑥) |
|---|---|---|---|---|---|
| 1 |  |  | 0.48 | 97 | 97 (60–65) |
| 2 |  |  | 0.50 | 111 | 1.61 (80–90) |
| 3 |  |  | 0.39 | 78 | 0.55 (70–80) |
| 4 |  | | 0.53 | 79 | 0.42 (47–50) |
| 5 | | | 0.57 | 108 | 0.56 (70–80) |
| 6 | | | 0.56 | 100 | 3.24 |
| 7 | | | 0.35 | 108 | 1.31 (47–50) |
| 8 |  | | 0.41 | 78 | 0.83 (85–95) |

TABLE II-continued

| Sample No. | Composition R¹① | R²① | n inh② (dL/g) | Tg③ (°C.) | OTR④⑤ (RH⑥) |
|---|---|---|---|---|---|
| 9 |  |  | 0.37 | 76 | 0.52 (80–90) |

①See Formula I
②η inh - inherent viscosity in DMF at 0.5 g/dL and 25° C.
③Tg - glass transition temperature
④ASTM Method D-3985 measured for compression molded films (23° C.–24° C.)
⑤Oxygen transmission rate (OTR) measured in cc-mil/100 in²-atm-day
⑥Relative humidity of the oxygen stream (%)

As evidenced by the data in Table II, the thermoplastic hydroxy/methylol poly(ether/esters) of the invention exhibit excellent barrier to oxygen permeation.

Comparative Example 1

A 100 mL minireactor equipped with a stirrer, two nitrogen inlets and a thermometer under nitrogen is charged with the diglycidyl ether of hydroquinone (4.73 g, 21.0 mmol, epoxy equivalent weight of 112.54 g/equiv epoxide), terephthalic acid (3.49 g, 21.0 mmol), N-methylpyrrolidinone (NMP)(9.8 mL) and benzyldimethyl amine (46 μL). The resulting mixture is heated to 130° C. for 30 min. An additional 15.6 mL of NMP is added and the mixture is heated at 130° C. for an additional 4 hours. The mixture is allowed to cool to room temperature and then is poured into 500 mL of water. The precipitate is collected, washed with water and methanol and dried at 40° C. overnight. The resulting polymer has an inherent viscosity of 0.43 dL/g in DMF. When the polymer is compression molded at 220° C. for 14 min. the resulting film is not soluble in DMF. Further, the melt flow rate of the polymer is measured according to ASTM Method 1286-89, Condition 200/5.0 and, after the initial equilibration period of 6 min. specified in the Method, the polymer does not flow from the apparatus. These results indicate substantial crosslinking of the polymer has occurred.

Comparative Example 2

The minireactor used in Comparative Example 1 is charged with the diglycidyl ether of bisphenol-A (13.737 g, 40.0 mmol) and isophthalic acid (6.643 g, 40.0 mmol). N-methylpyrrolidone (NMP, 25.8 mL) and N,N-dimethyl-benzylamine 89 μL) are added to the minireactor with stirring under nitrogen, and the mixture is heated to 130° C. for 30 min. Additional NMP (41 mL) is added and heating is continued at 130° C. for 4 hours. The mixture is allowed to cool to room temperature and is poured into water (500 mL) and mixed in a Waring blender. The precipitated product is collected by suction filtration and dried in a vacuum oven at 50° C. for 24 hours. The resulting product has an inherent viscosity of 0.24 dL/g in DMF at 25° C. The product is then compression molded at 200° C. for 14 min. to give a brittle film. A piece of the film is shaken with DMF, but the film does not dissolve. Comparative Examples 1 and 2 show that both high and low molecular weight polyesters prepared using basic catalysts in amide solvents crosslink upon exposure to thermal conditions typically used to fabricate or otherwise thermally process barrier thermoplastic polymers.

EXAMPLE 4

A 100 mL minireactor, equipped with stirrer, condenser and nitrogen inlet is charged with the diglycidyl ether of bisphenol-A (12.502 g, 36.4 mmol), isophthalic acid (5.984 g, 36.0 mmol) and tetra-n-butylammonium bromide (4.015 g, 12.5 mmol). Dioxane (35 mL) is added under a flow of nitrogen and the mixture is heated to reflux for 4 hours. The mixture is diluted with additional dioxane (50 mL) and poured into water (500 mL) in a Waring blender. The resulting precipitated product is dried under vacuum at 80° C. for 16 hours and is redissolved in tetrahydrofuran (100 mL). The product is reprecipitated into water and redried as described above. The resulting poly(ether/ester) has an inherent viscosity of 0.44 dL/g in dimethylformamide at 25° C. The poly(ether/ester) is compression molded into films at 220° C. in the manner described in Part B of Example 1. The resulting film is soluble in tetrahydrofuran. The poly(ether/ester) is tested for melt flow rate according to ASTM Method 1286-89, Condition 200/5.0 and, after the prescribed 6 minute equilibration period, found to have a melt flow rate of 7.72 g/10 min. After experiencing 30 minutes in the cylinder of the melt flow apparatus at 200° C., the poly(ether/ester) exhibits a melt flow rate of 6.90 g/10 min. The extruded strands of the polymer exiting the melt flow apparatus are soluble in dimethyl-formamide, thus exhibiting little or no crosslinking has occurred.

We claim:

1. A normally solid, thermoplastic methylol polyester having repeating units represented by the formula:

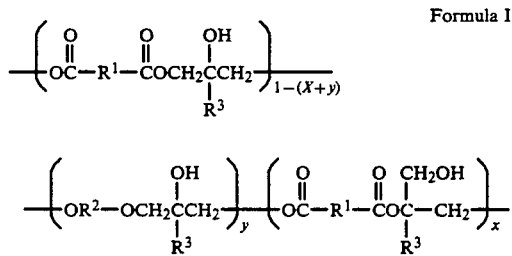

Formula I wherein each of $R^1$ and $R^2$ is individually a divalent organic moiety which is predominantly hydrocarbon, each $R^3$ is individually hydrogen or lower alkyl, y is a fraction from 0 to 0.5 and x is a fraction from about 0.05 to about 0.4.

2. The polyester of claim 1 wherein each of $R^1$ and $R^2$ is individually a divalent aromatic moiety selected from the group consisting of arylene, alkylenearylene, dialkylenearylene, diaryleneketone, diarylenesulfone, diarylenesulfoxide, alkylenecarbonylarylene, alkylenesulfonylarylene, alkylidene-diarylene, diarylene oxide, alkyleneoxyarylene, alkylenethioarylene, diarylene sulfide and diarylenecyanomethane.

3. The polyester of claim 2 wherein each of $R^1$ and $R^2$ is individually a divalent aromatic moiety selected from the group consisting of m-phenylene, p-phenylene, isopropylidene diphenylene, biphenylene, biphenylene oxide, methylenediphenylene, biphenylene sulfide, naphthylene, biphenylenecyanomethane, 3,3'-dialkyldiphenylene-isopropylidene, 3,3',4,4'-tetraalkyldiphenylene-isopropylidene, and similar alkyl-substituted derivatives of such aromatic moieties.

4. The polyester of claim 3 wherein each of $R^1$ and $R^2$ is individually m-phenylene, p-phenylene and isopropylidene diphenylene.

5. The polyester of claim 1 wherein each of $R^1$ and $R^2$ is individually a divalent aliphatic moiety selected from the group consisting of alkylene, dialkyleneketone, dialkylenesulfone, dialkylenesulfoxide, dialkyleneoxide and dialkylenesulfide.

6. The polyester of claim 5 wherein each of $R^1$ and $R^2$ is individually a divalent aliphatic moiety selected from the group consisting of ethylene, propylene and butylene.

7. The polyester of claim 1 wherein x is a number 0.1 to 0.3.

8. The polyester of claim 7 wherein x is a number from 0.1 to 0.2.

9. The polyester of claim 8 which is represented by the formula:

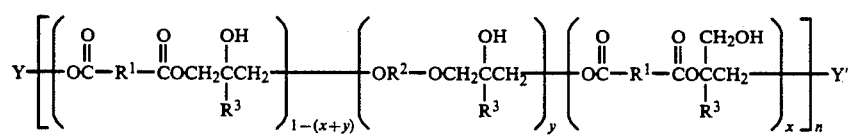

Formula II herein each Y and Y' is individually hydrogen or a monovalent organic terminating group, and n is a whole number from 10 to 1000.

10. The polymer of claim 9 wherein $R^1$ is m-phenylene, $R^2$ is isopropylidenediphenylene, x is 0.2, and n is 200 to 800.

11. The polymer of claim 9 wherein $R^1$ is p-phenylene, y is 0, x is 0.2 and n is a number from 200 to 800.

12. The polymer of claim 9 wherein $R^1$ is m-phenylene or p-phenylene; $R^2$ is isopropylidene-diphenylene, diphenylenecarbonyl, m-phenylene, p-phenylene and biphenylene; $R^3$ is hydrogen; y is 0.5; x is 0.125 and n is a number from 200 to 800.

13. The polymer of claim 1 in the form of a barrier container.

14. The polymer of claim 2 in the form of a barrier film.

15. The polymer of claim 1 in the form of a barrier coating.

16. The polymer of claim 1 in the form of a Foamed article.

* * * * *